(12) United States Patent
Hirayama et al.

(10) Patent No.: US 6,271,500 B1
(45) Date of Patent: Aug. 7, 2001

(54) ARC WELDING MONITORING DEVICE

(75) Inventors: Takahide Hirayama; Shinji Okumura; Keiichi Takaoka; Noriyuki Ohsawa, all of Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/485,170

(22) PCT Filed: Aug. 7, 1998

(86) PCT No.: PCT/JP98/03540

§ 371 Date: Feb. 7, 2000

§ 102(e) Date: Feb. 7, 2000

(87) PCT Pub. No.: WO99/07511

PCT Pub. Date: Feb. 18, 1999

(30) Foreign Application Priority Data

Aug. 8, 1997 (JP) .................................................. 9-227274

(51) Int. Cl.[7] .................................................. B23K 9/095
(52) U.S. Cl. .......................................... 219/130.01; 901/42
(58) Field of Search ........................ 219/130.01, 130.21, 219/130.5, 130.51; 901/42

(56) References Cited

U.S. PATENT DOCUMENTS 5,571,431 * 11/1996 Lantieri et al. .................. 219/130.01
6,096,994 * 8/2000 Handa et al. ...................... 219/130.5

FOREIGN PATENT DOCUMENTS

| 54-64054 | 5/1979 | (JP) . |
| 58-53374 | 3/1983 | (JP) . |
| 1-197069 | 8/1989 | (JP) . |
| 7-47471 | 2/1995 | (JP) . |

* cited by examiner

*Primary Examiner*—Clifford C. Shaw
(74) *Attorney, Agent, or Firm*—Armstrong, Westerman, Hattori, McLeland & Naughton, LLP

(57) ABSTRACT

The invention provides an arc welding monitoring device by which it is possible to easily find how detected data such as a welding current and welding voltage correspond to trajectories of a robot, in other words, welding line information of a welding work. The arc welding monitoring device comprises means 4 and 5 for detecting at least either the welding current or welding voltage, a means 14 for storing the detected data, a means 14 for storing trajectories of a robot, and a means for displaying, on a screen display, at least either the welding current or welding voltage detected by said detecting means, and the trajectories of the robot stored by the storing means, wherein a range is determined on the trajectories displayed on the screen display, and arc welding monitoring display is enabled in compliance with the range.

5 Claims, 3 Drawing Sheets

ARC WELDING MONITORING DEVICE

FIELD OF THE INVENTION

The present invention relates to an arc welding monitoring device which monitors arc welding and controls welding quality.

DESCRIPTION OF THE RELATED ART

Conventionally, as a device for monitoring arc welding, there has been a welding monitoring device which detects a welding current and a welding voltage during welding, distinguishes whether or not the detected data are within the predetermined range, and issues an alarm when either of the detected data is outside the range. For example, this method is disclosed by Japanese Patent Publication No. 7-2275. In Japanese Patent Publication No. 7-2275, in a device for monitoring arc welding by an arc welder, an arc welding monitoring device is disclosed, which comprises a means for detecting a welding current or an arc voltage, and A/D converter for converting analog output signals of the detecting means to digital signals in terms of a sampling frequency, a means for setting an operator period and fluctuation pitch to obtain a fluctuation mean, a means for setting a monitoring value to monitor the fluctuation mean value of the welding current or arc voltage, a means for judging welding conditions or welding results by comparing the fluctuation means value of the welding current or arc voltage with monitoring values, and a means for displaying and outputting the judgement results of the judging means. FIG. 3 shows one example of display screens of the detected data at this time, wherein the abscissa indicates a welding current, a welding voltage, and the ordinate indicates a period of time of welding. That is, this drawing is a graph showing changes in a welding current and a welding voltage with respect to welding time.

However, where, in welding made by an arc welding robot, welding conditions are monitored by a prior art welding monitoring device, it is possible to recognize whether or not any welding defect occurred, by acquiring changes in the welding current and welding voltage with respect to the elapse time of welding as shown in FIG. 3. However, it is not possible to understand which program of the robot has been used, in other words, which kind of a welding work has been welded. In particular, in a case where a complicated work is welded, by using an arc welding robot, it was difficult to know at which part of the welding work a defect occurred even though a welding defect is detected by the welding monitoring device. To the contrary, in a case where a welding defect is found by observing the welding work, there is a case where it is desired to analyze how the then welding current waveform or welding voltage form are brought about. But, in such a prior art welding monitoring device, it is not clear to which part of the detected data the welding current and welding voltage corresponding to the range selected by a welding work belong.

SUMMARY OF THE INVENTION

It is therefore an object of the present invention to provide an arc welding monitoring device by which it is possible to easily find the trajectories of a robot, in other words, how detected data such as welding current and a welding voltage, etc., correspond to welding line information of a welding work.

In order to achieve the above object, a first arc welding monitoring device, according to the present invention, is featured in being provided with, in an arc welding robot controlling device, a means for detecting at least either of a welding current or a welding voltage, a means for storing the detected data and trajectories of a robot, a means for displaying at least either of the welding current or welding voltage detected above on a display, and the trajectories of the robot stored by the abovementioned means, and a means for setting a range of displaying the detected data on the display.

A second arc welding monitoring device, according to the present invention, is featured in that parts of trajectories of the robot displayed on the above display are set by designating the parts thereof in the means for setting a range of displaying the detected data on the above display.

A third arc welding monitoring device, according to the invention, is featured in that, in the means for setting a range of displaying the abovementioned detected data on the above display, the setting is carried out by designating the range of data of the welding current or welding voltage, and parts of trajectories of a robot, which are designated above, are displayed with a different color from that of the other remaining parts thereof.

A fourth arc welding monitoring device, according to the invention, is featured in having a means for setting conditions of judging abnormalities in welding, and a comparator for comparing the conditions set by the setting means for judging abnormalities with the detected data, wherein, in a case where any abnormality or defect occurs when monitoring the detected data and judging any abnormality or defect, the range of data which was judged as abnormal welding is displayed with a different color from that of the other range.

A fifth arc welding monitoring device is featured in that the detected and stored data are date obtained by various types of sensors other than the welding current and welding voltage.

According to an arc welding monitoring device disclosed by the invention, the following effects and advantages can be obtained; wherein (1) Welding current and welding voltage are correlated with and stored along with robot operation programs, wherein since not only a welding current and a welding voltage but also trajectories of the robot used for welding are displayed on a display screen it is possible to easily find to which welding work the welding current and welding voltage data correspond, or how welding lines of the welding work are taught.

(2) Since it is possible to check which part of data of the trajectories of a robot the data such as a welding current and welding voltage, which are displayed on a display screen, display, any unstable portion of the welding condition can be specified, and it is possible to find portions at which the welding conditions are to be changed or the welding posture of a robot is to be changed, thereby contributing to improvement in the welding quality.

(3) Since it is possible to specify a portion of abnormal or defective welding, it is sufficient to check the portions which are judged abnormal or defective, when conducting a visual defect detection on welding work.

(4) Since data such as a welding current and welding voltage at appointed portions of welding work can be displayed, it is possible to find patterns of the welding current and/or welding voltage at the portions where any abnormal or defective welding is visually found. Therefore, it is effective to analyze the arc welding phenomenon.

(5) It is also possible to monitor information such as, for example, wire feeding speed, gas flow rate, etc., in addition to the welding current and welding voltage.

BEST MODE FOR CARRYING OUT THE INVENTION

Figure 1:
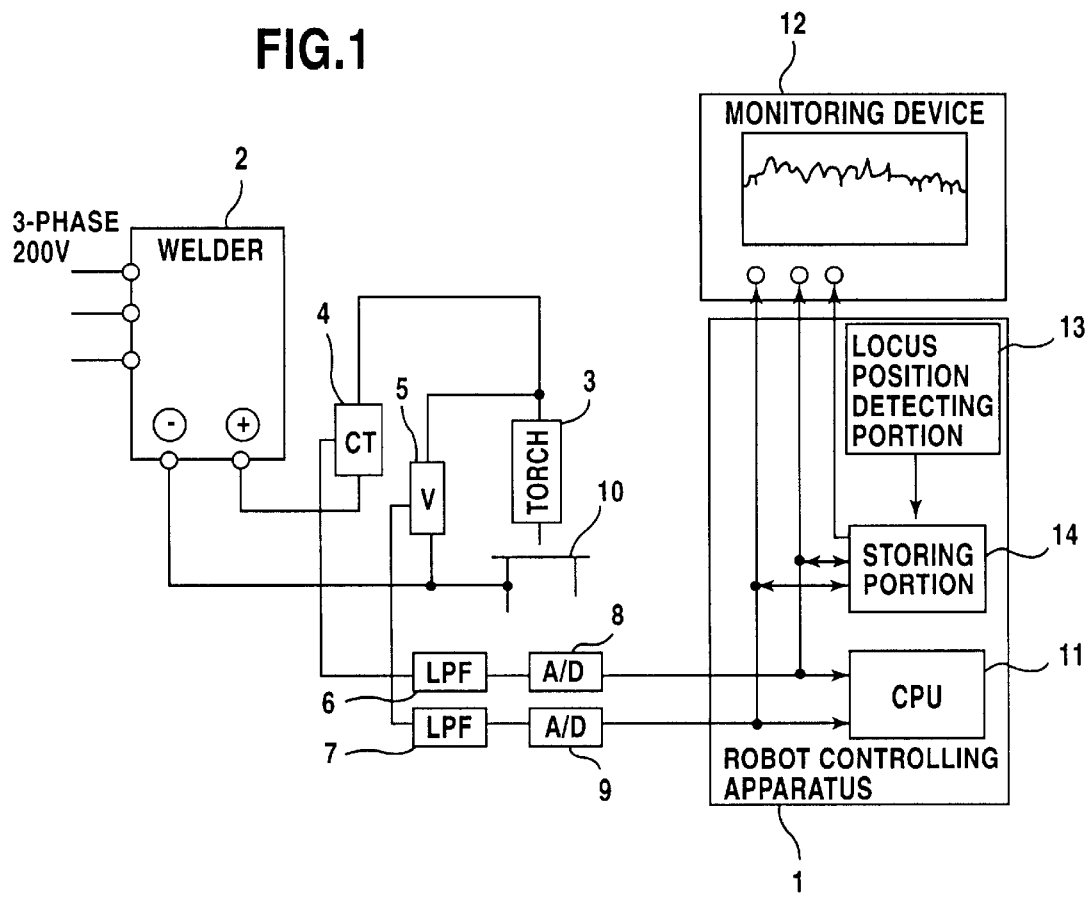
FIG. 1 is a general configurational view of a preferred embodiment of the invention.

Hereinafter, a description is given of an arc welding monitoring device as a preferred embodiment of the invention. FIG. 1 is a general configurational view of a system for carrying out the invention, wherein 1 is a robot controlling device, 2 is a welder, 3 is a torch attached to a robot (not illustrated), and 12 is a monitoring device.

Hereinafter, a description is given of an operation flow of welding execution and detection of a welding current and a welding voltage. An arc is generated by applying voltage, which is provided by the welder 2, between parent metal 10 and the torch 3, whereby a welding bead is formed by moving the torch 3. At this time, a current detector 4 detects the welding current, and a voltage detector 5 detects the welding voltage. The detected welding current and welding voltage are inputted into low-pass filters 6 and 7, wherein high frequency components (noise) are removed. And the data are converted to digital values by A/D converts 8 and 9 and are picked up into the robot controlling device 1. The picked up welding current and welding voltage are variously operated and processed by a central processing unit (hereinafter called "CPU") 11, whereby the arc state is monitored in compliance with various types of algorithms, and the picked up welding current and welding voltage are adequately stored in a storing portion 14. The trajectory information of the robot is acquired by a locus position detector 13 in the robot controlling device 1, and the information is stored in the storing portion 14.

In the first preferred embodiment, a motion simulation of a robot is carried out on the display of the monitoring device 12 based on the robot trajectory information stored in the storing portion 14, and a trajectory of the robot is displayed thereon. Simultaneously, the welding current and welding voltage stored in the storing portion 14 are displayed on the display of the monitoring device 12, whereby it is possible to not only observe changes in the welding current and welding voltage but also check the movement programs of the robot, whereby it is possible to find a pattern of a welding line of a welding work.

Figure 4:
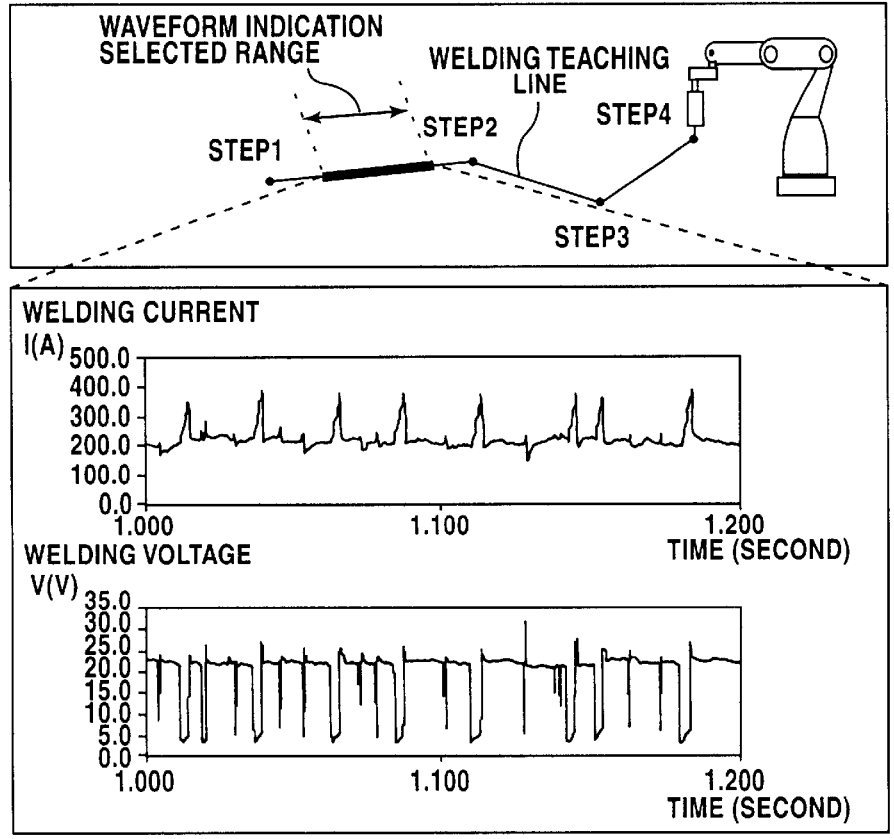
FIG. 4 is an example of a screen display of the welding current, welding voltage and trajectories, which are displayed on a monitor screen by an arc welding monitoring device of the present invention.

In the second preferred embodiment of an arc welding monitoring device, a robot movement simulation is carried out on the display of the monitoring device 12 based on the robot trajectory information stored in the storing portion 14, whereby the robot trajectory is displayed. As a method for setting a range of screen displays of the welding current and welding voltage stored in the storing portion 14 on the display when the trajectory of a robot is displayed, for example, a mouse may be used as a peripheral input device. By setting a range of trajectories for which change in the detected data are required to be checked, using a mouse, the contents of the welding current and welding voltage data in a range can be displayed on the display of the monitoring device 12. FIG. 4 shows one example of the screen displays at this time. In the drawing, the upper stage indicates the trajectories of a robot while the lower stage indicates changes in the welding current and welding voltage. In the same drawing, the robot moves in the order of step 1, step 2, step 3, step 4, wherein step 1 is the initiating point of welding and step 4 is the terminating point of welding while steps 2 and 3 are points of teaching. Herein, the range depicted by the thick line between step 1 and step 2 indicates the selected range for indicating waveforms selected by an inputting device such as a mouse, etc., whereby an operator can easily find the contents of the welding current and welding voltage data at the designated points of welding work by only designating a range of trajectories corresponding to the welding work.

Figure 5:
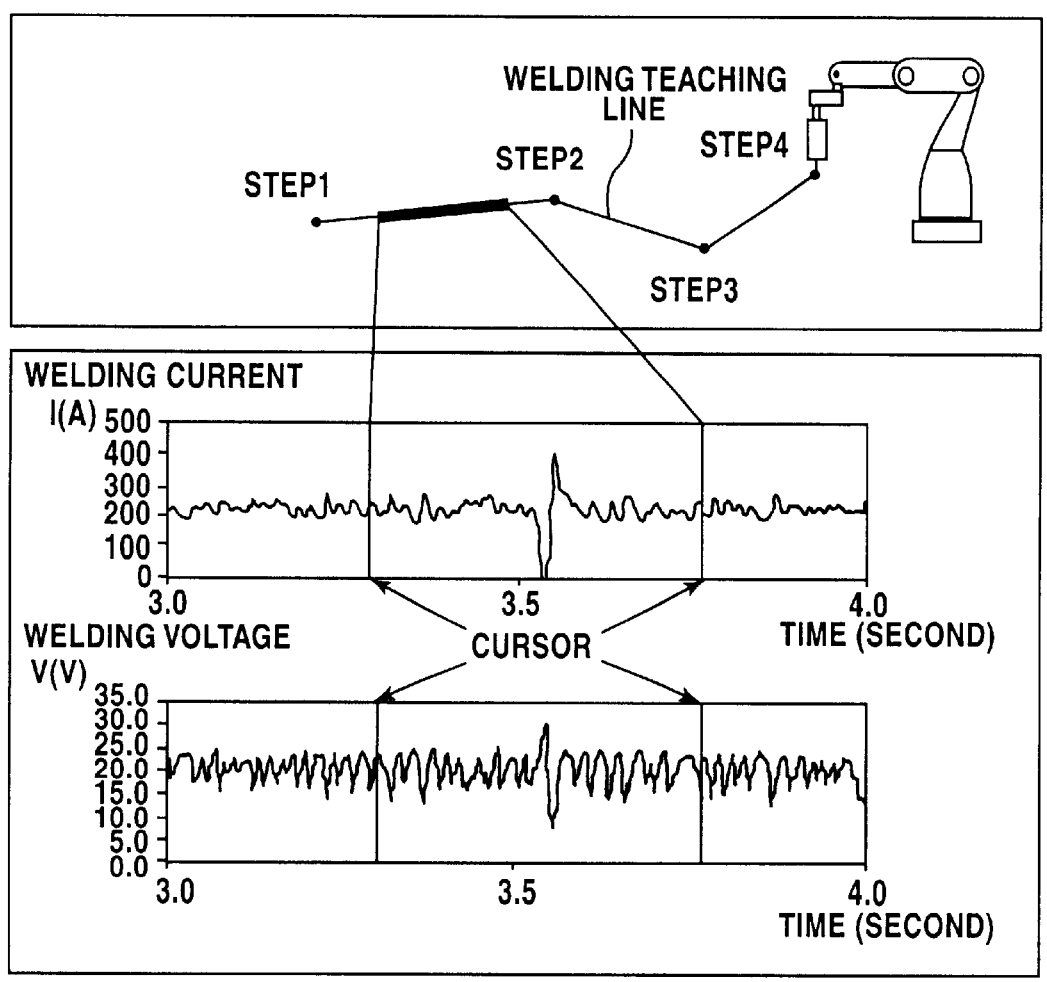
FIG. 5 is another example of a screen display of the welding current, welding voltage and trajectories, which are displayed on a monitor screen by an arc welding monitoring device of the present invention.

In the third preferred embodiment of an arc welding monitoring device, as in the second embodiment, a motion simulation is carried out on the display of the monitoring device 12 based on the robot trajectory information stored in the storing portion 14. And, the welding current and welding voltage stored in the storing portion 14 are concurrently displayed on the display. There is a case where it is necessary to check to which part of trajectories a certain range of data of the welding current and welding voltage displayed on the display corresponds. In such a case, for example, the cursor is displayed on the welding current and welding voltage graph, whereby the data range is designated. The trajectory portion corresponding to the range is displayed with, for example, a color different from that outside the range, whereby it is then possible to distinguish to which portion of the trajectories the selected range of the welding current and welding voltage data belong. FIG. 5 shows one example of display screens at this time. In the same drawing, the upper stage indicates trajectories of the robot while the lower stage indicates changes in the welding current and welding voltage. In the same drawing, the robot moves in the order of step 1, step 2, step 3, and step 4, wherein step 1 is the initiating point of welding and step 4 is the terminating point of welding while steps 2 and 3 are points of teaching. Herein, the range depicted by the thick line between step 1 and step 2 expresses an area in which the welding current and welding voltage in the range selected by the cursor at the lower stage in FIG. 5 are obtained. Thereby, where an extraordinary point is found in changes in the patterns of the welding current, welding voltage data, etc., it is possible to easily distinguish to which part of the trajectories or the welding work the data correspond.

Figure 2:
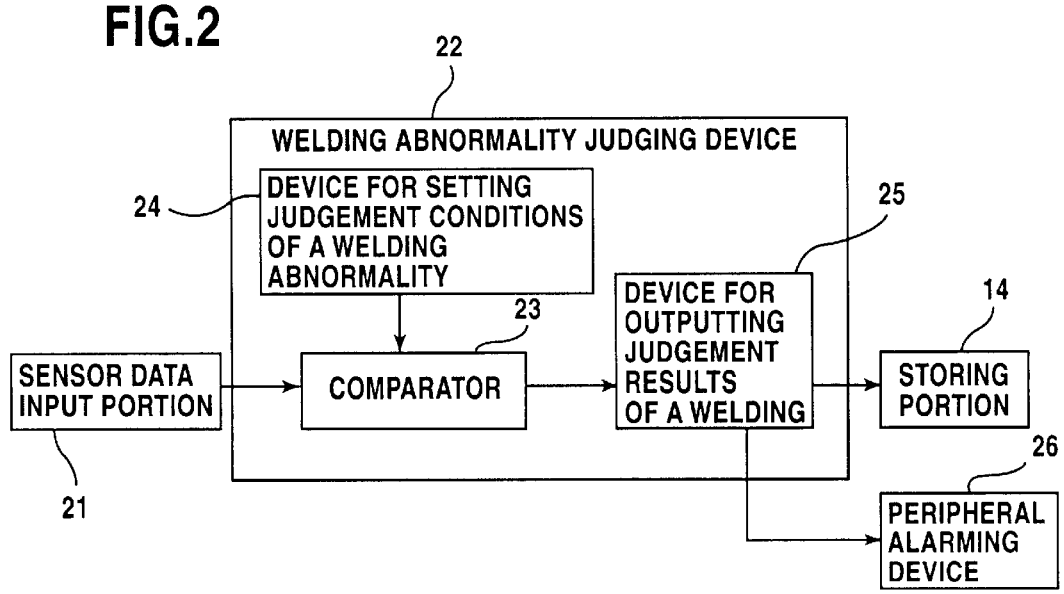
FIG. 2 is a view showing the outline of an abnormal welding judgement processing portion of the preferred embodiment of the invention.
Figure 3:
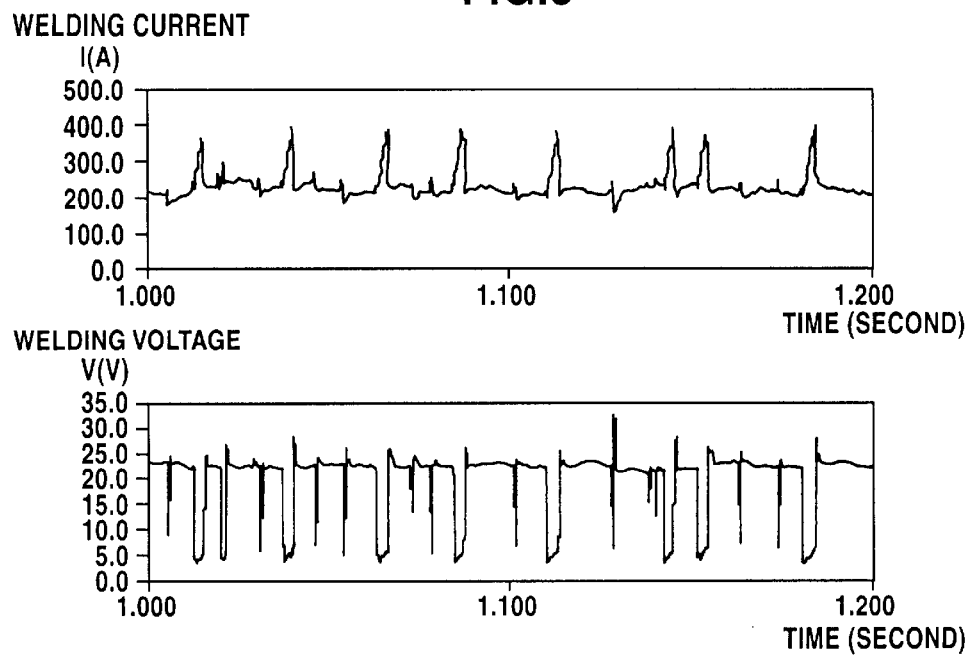
FIG. 3 is a description of a screen display of a welding current and a welding voltage, which are displayed on a monitor screen, in a prior art arc welding monitoring device.

In the fourth preferred embodiment, welding state monitoring can be carried out by further adding a portion for processing judgement of a welding abnormality to the second and third embodiments. FIG. 2 is a block diagram of one preferred embodiment of the portion for processing judgement of a welding abnormality. Judgement of a welding abnormality is carried out by a welding judging device 22 in the robot controlling device 1. The welding abnormality judging device 22 consists of a welding abnormality judging condition setting device 24, comparator 23, and an output device 25 of welding abnormality judgement results. Data acquired by various types of sensors are picked up into a sensor data input portion 21, wherein the picked up data are compared by the comparator 23 with reference values predetermined by the welding abnormality judging condition setting device 24. Unless the detected data are within the abovementioned reference values, information on occurrence of a welding abnormality is stored in the storing portion 14 by the output device 25 of welding abnormality judgement results. Further, simultaneously, an abnormality detecting signal is outputted to a peripheral device by a peripheral alarm device 26, in order to notify that an abnormality has occurred. In addition, as an algorithm for judging a welding abnormality, the number of times of shortcircuiting, mean welding current value, mean welding voltage value, etc., may be utilized. With respect to displaying of the measured data by the monitoring device 12, a motion simulation is carried out on the display on the basis of the robot trajectory information stored in the storing portion 14 as in the second and third preferred embodiments.

In the fifth preferred embodiments, it is possible to concurrently display, on the display, information obtained by various types of sensors, such as, for example, a wire feeding speed, gas flow rate, etc., including various types of measured data other than the welding current and welding voltage stored in the storing portion 14. The portion which is judged abnormal, of various types of measured data displayed on the display is indicated with a color different from that in a normal case. Further, with respect to the trajectories, a portion which is judged abnormal is indicated with a color different from that in a normal case, whereby it is possible to easily distinguish to which range of data the portions which are judged abnormal in changes in the patterns of various types of measured data belong, or at which part of the trajectories, that is, the welding work, it is abnormal.

[Industrial Applicability]

The present invention relates to an arc welding monitoring device which takes roles of monitoring welding states and controlling the welding quality, in an arc welding robot system.

What is claimed is:

1. An arc welding monitoring device of an arc welding robot controlling apparatus, comprising:

detecting means for detecting electric signals consisting of either a welding current or a welding voltage;

storing means for storing said detected welding electric signals and trajectories of a robot;

display means for displaying, on a screen display, either the welding current or welding voltage detected by said detecting means and trajectories of a robot, which are stored by said storing means; and a means for setting a range of data of said welding current or said welding voltage to be displayed.

2. An arc welding monitoring device as set forth in claim 1, wherein setting is carried out by designating the portion of the trajectories of the robot, which is displayed on said screen display.

3. An arc welding monitoring device as set forth in claim 1 or 2, wherein setting is carried out by designating said range of data of said welding current or said welding voltage, and the portion of the trajectory of the robot at the range-set position is indicated with a color different from that of the other remaining portion.

4. An arc welding monitoring device as set forth in claim 1 or 2, further comprising:

setting means for setting judgement conditions of a welding abnormality; and a comparator for comparing the conditions established by said setting means with said detected data, wherein, whenever any abnormality is found to have been generated by monitoring said detected data and judging a welding abnormality, the range of data in which a welding abnormality occurred is displayed on the trajectory with a color different from that of the other remaining range.

5. An arc welding monitoring device as set forth in claim 1 or 2, wherein said storing means stores data acquired by various types of sensors in addition to the welding current and the welding voltage.

\* \* \* \* \*